United States Patent
Briggs

[15] 3,659,892
[45] May 2, 1972

[54] MISSILE RACK ADAPTER
[72] Inventor: Robert F. Briggs, Camarillo, Calif.
[73] Assignee: The United States of America as represented by the Secretary of the Navy
[22] Filed: June 29, 1970
[21] Appl. No.: 50,773

[52] U.S. Cl. ............................296/3, 296/35.1, 105/366 A, 248/119 R
[51] Int. Cl. ...........................................................B60p 3/00
[58] Field of Search ....................296/3, 35.1; 105/366 A; 248/119 R

[56] References Cited

UNITED STATES PATENTS

| 3,242,809 | 3/1966 | Bauer | 248/119 R |
| 3,161,151 | 12/1964 | Johansson | 105/366 A |
| 2,656,196 | 10/1953 | Fellabaum | 296/35.1 |

FOREIGN PATENTS OR APPLICATIONS

| 644,313 | 4/1937 | Germany | 296/3 |

*Primary Examiner*—Philip Goodman
*Attorney*—Richard S. Sciascia and Q. Baxter Warner

[57] ABSTRACT

An adapter member for rendering a cluster-type missile rack supportable on storage brackets or on missile transport vehicles having a variety of differently arranged load bearing surfaces. Each adapter has on its undersurface at least two spaced support contacting surfaces, and includes means to lock the adapter to its support. Shock absorbing vibration isolaters are incorporated into the design.

8 Claims, 8 Drawing Figures

Patented May 2, 1972

Robert F. Briggs
INVENTOR

By

Q. Baxter Warner
Attorney

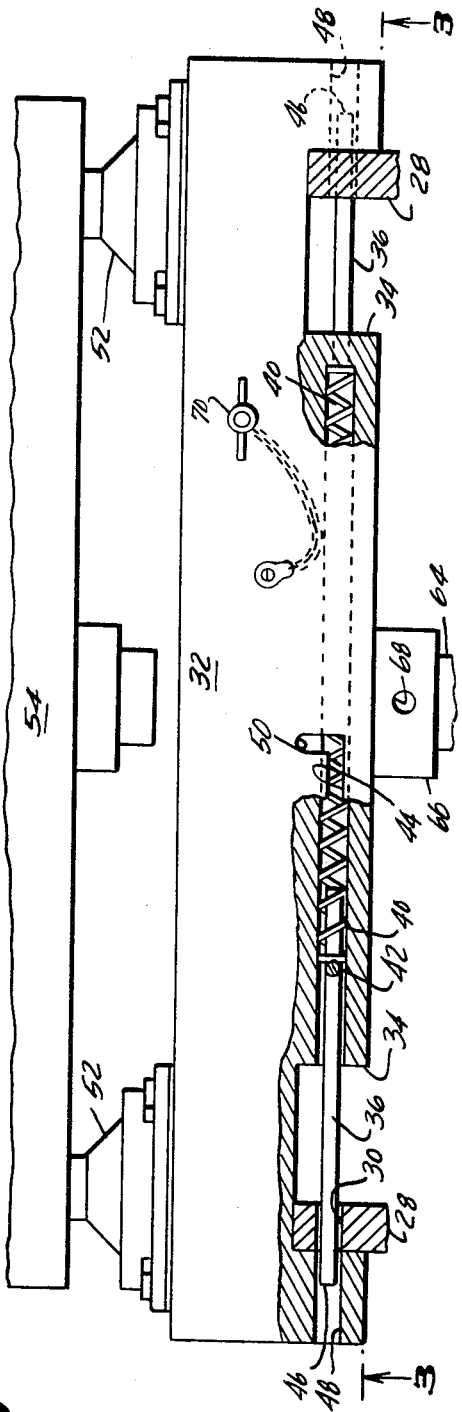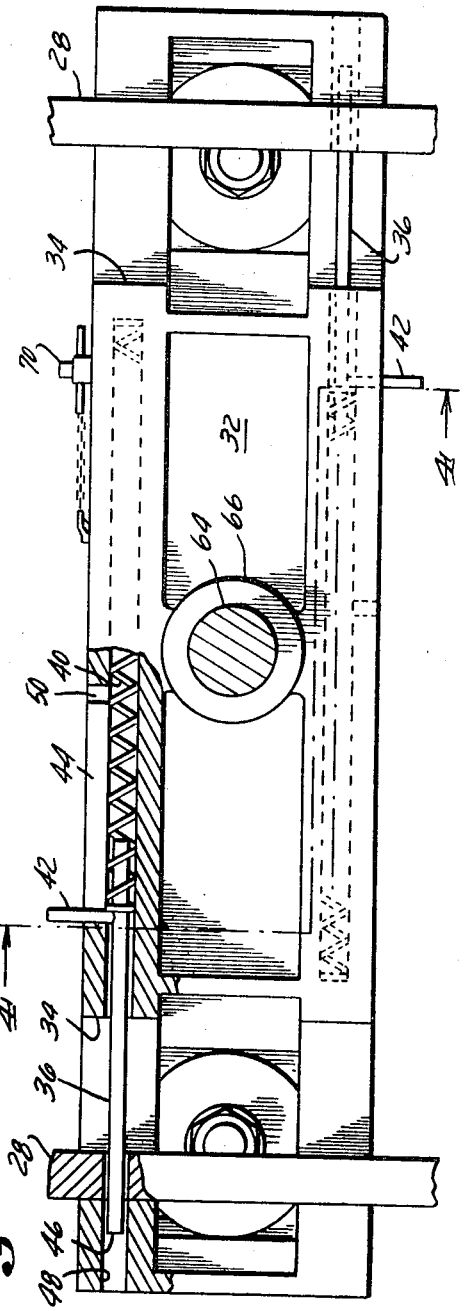

Robert F. Briggs
INVENTOR

By
P. Baxter Warner
Attorney

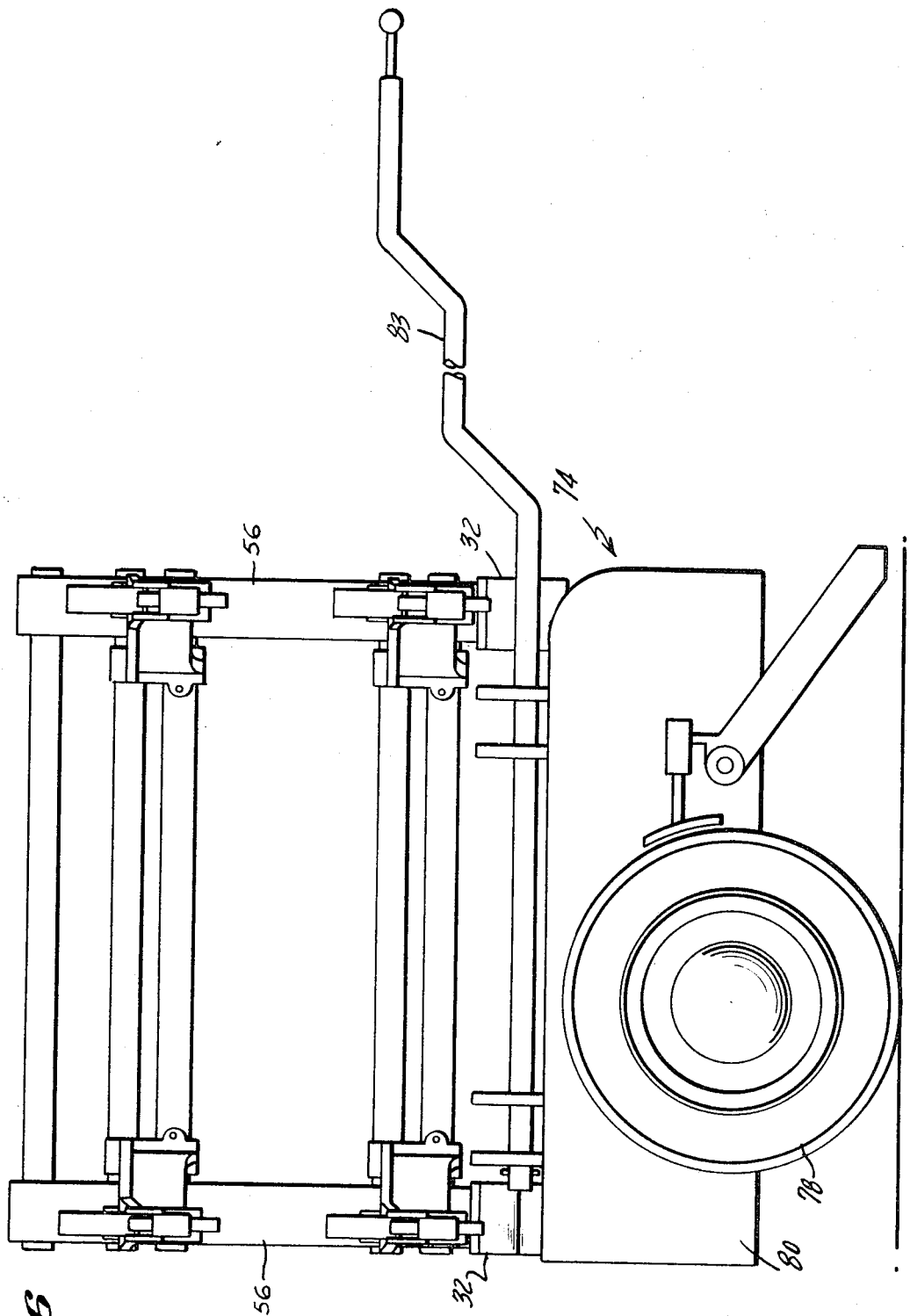

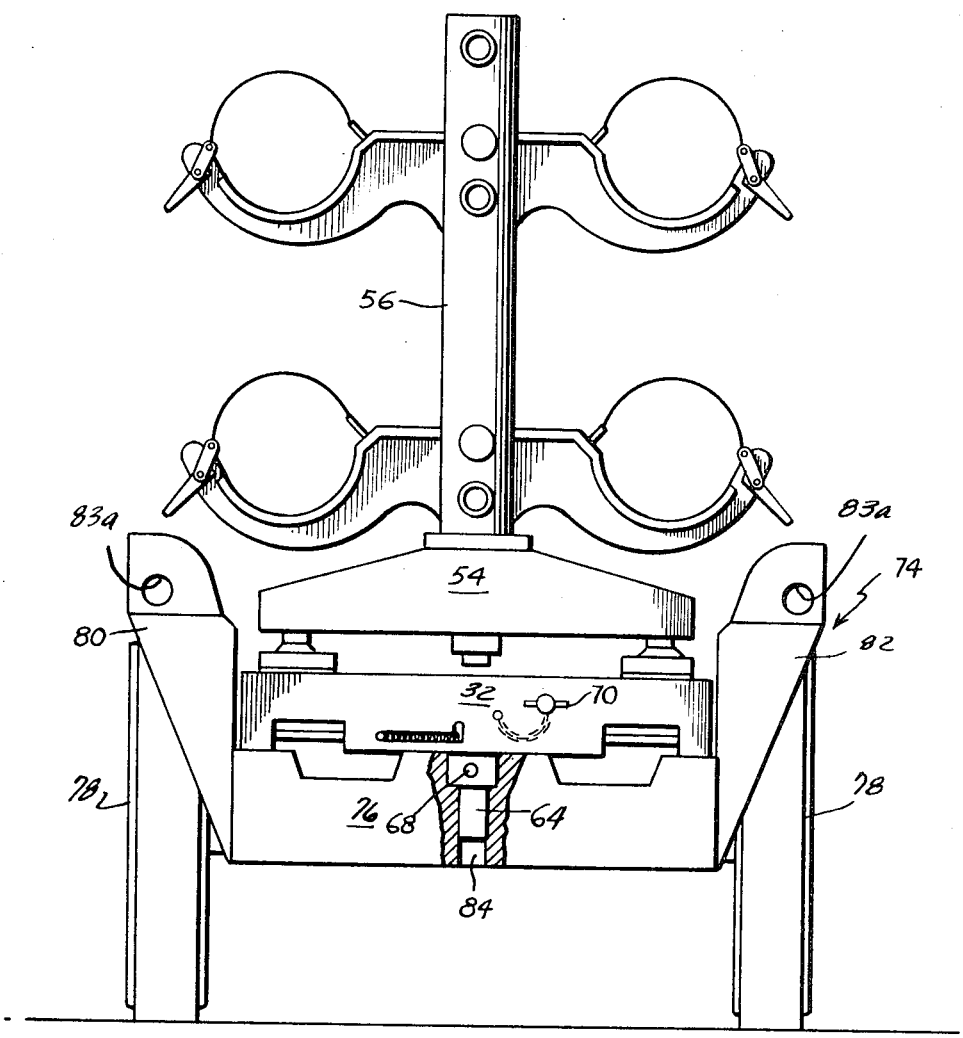

MISSILE RACK ADAPTER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

This invention relates to missile handling equipment and particularly to equipment for storing and transporting missiles in multi-missile units.

2. Description of the Prior Art

In the handling of elongate objects such as missiles, rockets and the like, it has become common practice to employ a framework or rack whereby several such objects are supported together in parallel juxtaposition and dealt with as a unit. Such rack arrangements generally comprise a pair of central stanchions and laterally extending arms to which individual elongate objects are secured as by straps or clamps. Decreased available space in modern weapon storing and assembling quarters plus increased weapon size renders it essential that the objects be nested as closely together as possible without hazarding actual contact so that all space is utilized to the utmost. There are, however, in use several types or styles of missile vehicles and storage brackets each with different dimensional configurations of the rack-engaging portions thereof. Hence it becomes important to provide a rack to vehicle adapter which will fit both the storage bracket and the various types of vehicle load supporting surfaces. Also it is important that such adapter operate efficiently within the confines of available space and keep the overall load profile at a minimum so that the missile transporter and its load can easily pass through low clearance doorways, hatches, bomb bays, etc.

SUMMARY OF THE INVENTION

A low profile vibration-isolating missile rack adapter for mounting a missile rack assembly on a stowage support or upon a mobile vehicle. Means are provided for accommodating variations in the load support surfaces of the vehicle. Ordinarily a pair of adapters is used to bridge the usual missile cart load support rails and each may be secured thereto at suitable intervals. Each adapter includes vibration isolators to minimize load shock during missile transport. Because of the compact design, the overall load profile is kept to a minimum so that it is possible to operate in confined quarters.

STATEMENT OF THE OBJECTS OF THE INVENTION

One object of the present invention is to provide means for mounting a missile-supporting rack assembly on a mobile transport vehicle.

Another object is to provide means for adapting such missile load to transport vehicles having variously dimensioned load engaging surfaces.

Another object is to provide a missile assembly having a low profile and minimum external configuration.

Still a further object is to provide means for isolating a missile load from shock and vibration during movement.

A further object is to provide the foregoing in conjunction with means for conveniently supporting said racks on brackets in a storage area until transferred to a mobile transport vehicle.

Other objects, advantages and novel features of the invention will become apparent from the following detailed description of the invention when considered in conjunction with the accompanying drawings wherein:

BRIEF DESCRIPTION OF THE DRAWINGS

FIG. 2 is an enlarged transverse elevation view, partially broken away, of one of the adapter members of FIG. 1 and taken on a line substantially corresponding to line 2—2 of FIG. 1.

FIG. 3 is a bottom view with portions broken away of the device of FIG. 2 taken along a line substantially corresponding to line 3—3 of FIG. 2.

FIG. 6 is a side elevational view of the rack and adapter of FIGS. 1–4 shown mounted upon a different style of missile transporting vehicle.

FIG. 7 is an end view of the construction of FIG. 5.

DESCRIPTION OF THE PREFERRED EMBODIMENT

Figure 1:
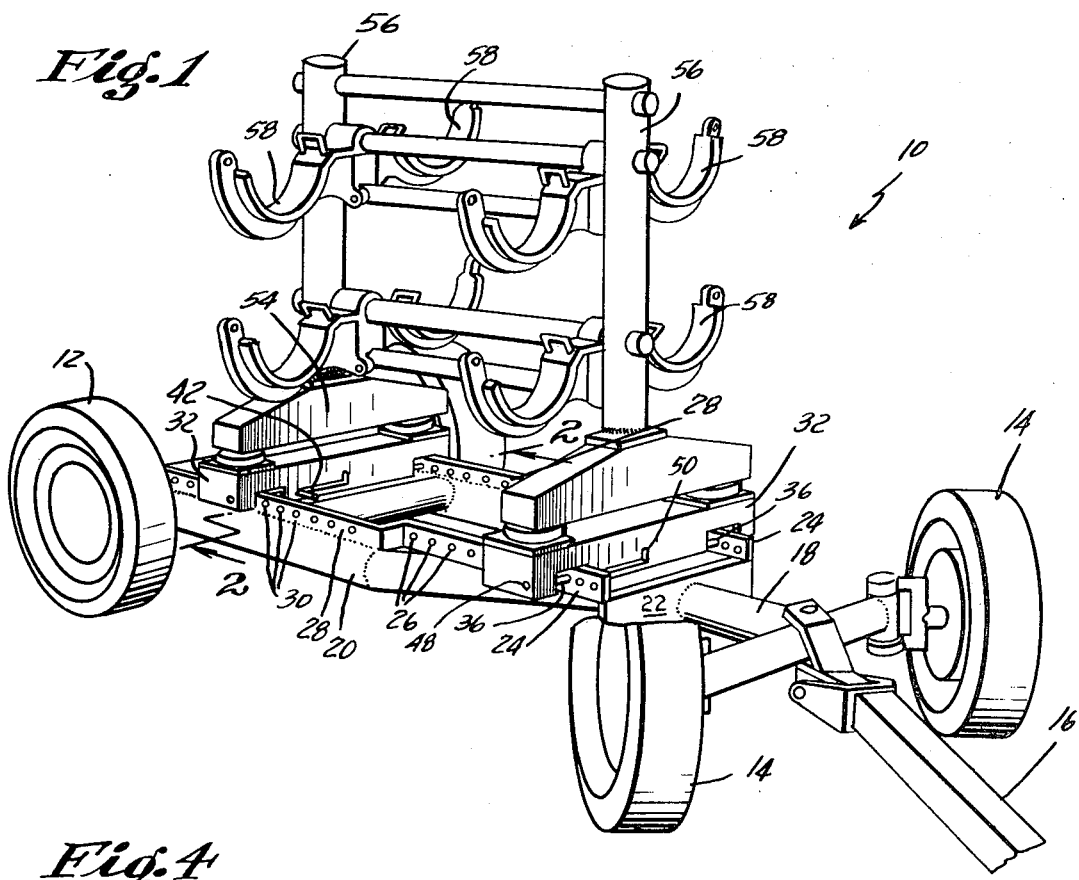
FIG. 1 is a perspective view of a conventional missile transporting vehicle showing how two spaced adapter members may be employed to support a missile rack assembly.

Referring now to the drawings in detail, the mobile missile transporting vehicle 10 of FIG. 1 ordinarily comprises a cart having rear wheels 12 and pivotally mounted front wheels 14, the latter being steerable through lateral movement of a tongue member 16 which may be used to pull the vehicle along a surface such as a hanger apron or aircraft carrier dock.

The cart may include a framework formed of tubular sections generally arranged in a "Y" shape when viewed from above. The stem of the "Y" is formed of tubular section 18 which branches into two spaced rearwardly extending arms 20. A cross member 22 supports the forward ends of two spaced front load supporting rails 24. Each rail stands on edge and is provided with a plurality of openings 26 spaced along its length to receive an adapter holddown bolt in a manner hereinafter to be described. The front rails 24 are relatively closer together than similar rails 28 which are located to the rear and are supported upon the rearwardly directed arms 20 of the tubular "Y" frame. As shown the rear rails 28 may also be perforated along their length with openings 30 to similarly receive holddown bolts in a manner hereinafter to be described.

Bridging the load supporting rails 24 and 28 are two identical adapter members 32 each having an upper surface 33 and an under surface 35. These adapter members 32 are so disposed that wide notches or slots 34 on their under surfaces receive either of the upright load supporting rails 24 and 28 in the manner best illustrated in FIGS. 2 and 3. Referring to those latter views in detail, rear rails 28 are shown located within the wide notches or slots 34 and are located toward the outboard portions thereof. The adapters 32 are locked in such position by a pair of axially moveable holddown bolts 36, one for each notch 34. Each bolt 36 is urged outwardly by a compression spring 40 and may be manipulated from an inboard to an outboard position by an operating knob 42 which protrudes laterally from the side of each adapter member through open slot 44. As best shown in FIG. 3, a holddown bolt is provided for each notch 34 and the bolts may be staggered so that actuating knobs 42 extend from opposite sides of adapter members 32.

When a bolt 36 is in the outboard position, its tip portion 46 extends through one of the selected openings 26 or 30 in rail 24 or 28 and is accommodated in an opening 48 provided near each end of the adapter member 32. When it is desired to unlatch the bolt mechanism and free an adapter 32 from its rail, actuating knob 42 is moved inwardly and then raised upwardly so that the knob rests in a retention slot 50 provided at the inboard end of each slot 44. It will be apparent that with this arrangement the bolt may readily be retracted and held against the force of compression spring 40 with its tip portion 46 clear of the notch 34. Thereafter, when it is desired to slide the bolt home, all that need be done is to move actuating knob 42 downwardly clear of retention slot 50, whereupon spring 40 will drive it through a selected opening 30 into the home position illustrated in FIGS. 2 and 3.

It will be apparent that adapter 32 may be mounted upon either the widely spaced rear rail members 28 or the more closely spaced front rail members 24. In the latter instance such rail members will occupy an inboard position in notch 34 instead of the outboard position as demonstrated with rail 28.

In order to prevent shock transmittal from the vehicle to the load during vehicle movement there are provided, on the upper opposite ends of each adapter 32, vibration isolaters 52 which may be of any of the well known yieldable, flexible or resilient type. The vibration isolaters 52 support a cross member identified by the reference character 54 which serves as a base for the rack assembly and, as shown, is located above and spaced from adapter member 32. In the rack assemblies illustrated two cross members 54 are shown and each has a centrally located vertically extending upright stanchion 56, which supports pairs of oppositely directed contoured missile supporting cantilever arms 58. In practice elongate missile bodies are cradled in these arms and may be strapped or clamped thereto by any suitable means. It will be apparent that more than one pair of missiles may be carried by superimposing successive tiers of cantilever arms supported by the stanchions 56.

Figure 4:
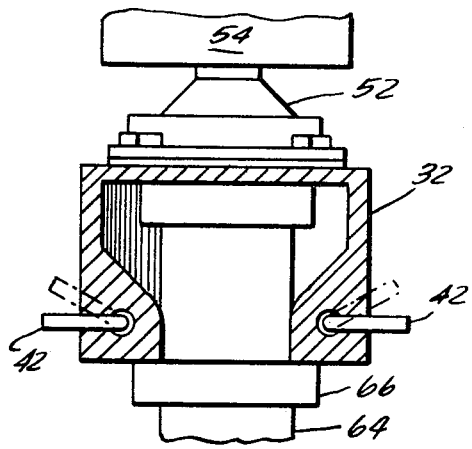
FIG. 4 is a transverse sectional view of the embodiment of FIGS. 2 and 3 taken along a line substantially corresponding to line 4—4 of FIG. 3.
Figure 5A:
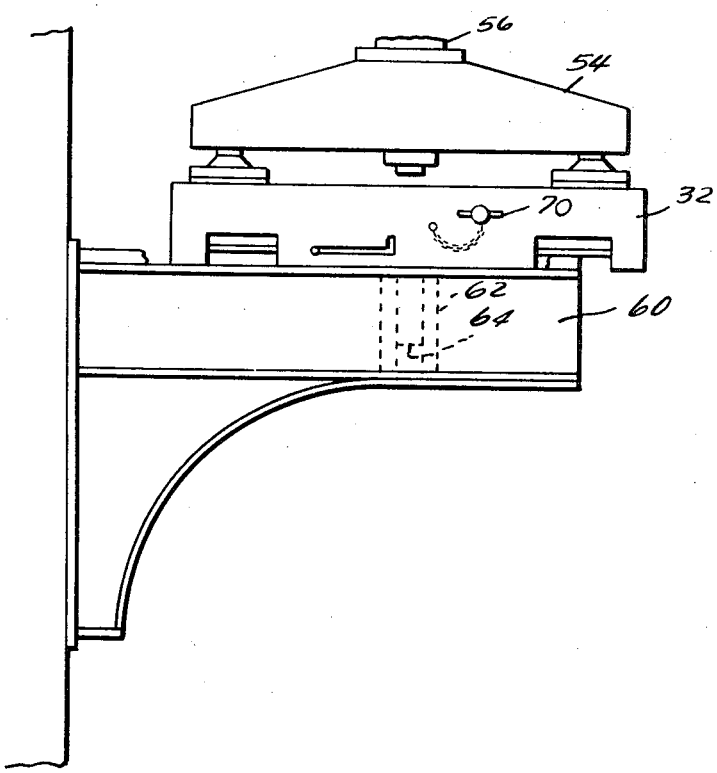
FIGS. 5a and 5b are fragmentary end and side views respectively showing how the adapter and rack supported thereon may readily be accommodated on a bracket in a storage area.
Figure 5B:
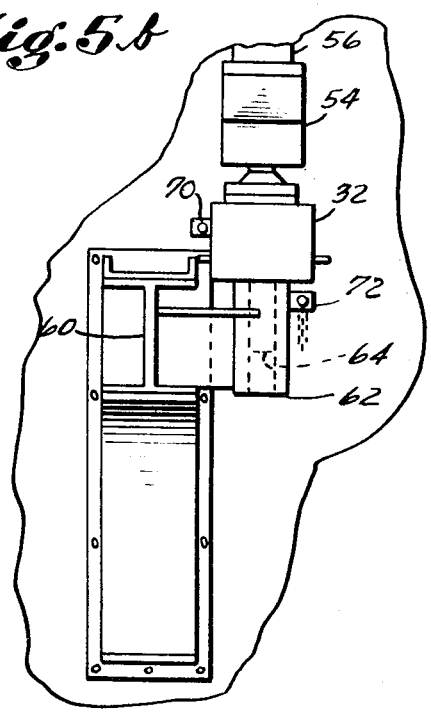

It is the practice to store assembled clusters of rack supported missiles upon brackets or fixtures in a storage area with the rack base resting upon suitable support abutments. FIGS. 5a and 5b show such a storage arrangement wherein a bracket 60 has a vertically oriented socket 62 to receive a centrally located stem or peg 64 shown depending from the under surface of each adapter 32. Each peg has an enlarged collar portion 66 (see FIGS. 2, 3 and 4) through which extends a transverse opening 68 to receive a locking pin 70 secured by a lanyard to the bracket. The same opening 68 may receive a similar locking pin 72, one such pin being secured by a lanyard to each adapter 32. By this means the adapter may readily be locked onto some styles of missile transport vehicles. With this arrangement a filled rack may be transferred as a unit from the bracket to a rack transporting cart without disturbing the assembled missile cluster.

The adapter bar of the present invention is readily accommodated by a different type of mobile vehicle such as the skid illustrated in FIGS. 6 and 7. These views show the manner in which a rack supported by an adapter 32 may be mounted on a two wheeled skid 74. As shown such skid includes a bottom member 76 having wheels 78. Bottom member 76 includes upwardly directed sides 80 and 82 between which the adapter may be accommodated. Bottom member 76 also has spaced medially aligned sockets 84 to receive the aforementioned rack supporting stem or peg 64, and, as in the other versions, this stem may be locked in place by a suitable transversely located locking pin.

In this embodiment a handle 83 may be inserted in openings 83a to facilitate manipulation of skid 74.

Of course, the vehicle types illustrated are merely to demonstrate the form which a vehicle or bracket may assume. Such adapter may also be employed in conjunction with other vehicles and brackets as will readily be apparent to one skilled in the art.

With the adapter described a missile cluster assembly with missiles closely nested in place, may be transferred from a storage platform to one of the vehicles of the character illustrated with a minimum manipulation of the missiles and small likelihood of damage during the transfer operation. When transferred to a vehicle of the type illustrated in FIG. 1, it will be held in place with the spring urged bolts 36. It will be noted that if desired the entire missile rack may be reversed, end for end, since the notches 36 are sufficiently wide to readily accommodate either the closely spaced rails 24 or the more widely spaced rails 28.

During this loading operation the spring biased bolts 38 have been restrained to their retracted positions by knobs 42 engaged in retention slots 50. Thereafter with the adapter in place knobs 42 need only be pushed downwardly to permit springs 40 to drive the bolts through the registering opening 26 or 30 and securely fasten the load to the cart. Openings 26 and 30 are preferably made sufficiently oversize to prevent binding of the bolts 38 therein. The missile assembly may then be transported to the point of use and, because of its low profile and compact nature, passes easily through small openings and under low overhead structures in a manner which would otherwise be impossible.

Obviously many modifications and variations of the present invention are possible in the light of the above teachings. It is therefore to be understood that within the scope of the appended claims the invention may be practiced otherwise than as specifically described.

I claim:
1. In combination:
   a rack having provision for supporting a plurality of elongate heavy objects in close juxtaposition,
   said rack having a base portion,
   a mobile vehicle adapted to support and transport said rack and contents,
   said vehicle having a plurality of spaced load supporting rails,
   and means for mounting the base portion of said rack upon the rails, said means comprising an adapter member of sufficient length to more than span the distance between the spaced rails of the vehicle,
   said adapter member having surfaces adjacent each end to contact said rails for support thereby,
   and means for locking said adapter member in place upon the rail,
   the spaced load supporting rails each having apertures extending transversely therethrough and the locking means comprising a pin extendable through selected apertures in each of the spaced rails.

2. The combination of claim 1 wherein the adapter member also has a centrally located downwardly directed alignment peg so that said adapter member may alternatively be supported by either said spaced rails or by a surface including a support socket into which said peg is received.

3. The combination of claim 1 wherein said locking pin is normally retained in locked position by a spring member.

4. The combination of claim 1 wherein the rail contacting surfaces adjacent each end of the adapter comprises notches in the undersurface thereof.

5. The combination of claim 1 wherein the notches are of sufficient width to accommodate either widely spaced or narrowly spaced load supporting rails.

6. In a missile-supporting rack assembly and transporting means therefor wherein the rack is removable as a unit from a fixed storage location to a mobile transport vehicle having spaced support rails, the combination of;
   an adapter of length sufficient to overhang said rails when placed transversely thereacross,
   said adapter having rail receiving notches adjacent each end thereof,
   locking means adjacent each notch area and movable into locking engagement with the adjacent support rail to lock the adapter to the rails being engaged,
   said adapter also having a downwardly directed alignment peg depending from its central underneath portion adapted for insertion into a socket for rack support thereby.

7. An adapter for supporting a load alternatively by either spaced rails having perforations therealong or by a vertically oriented socket, said adapter comprising;
   an elongate rigid bar of rectangular cross-sectional configuration, said bar having an upper surface and an under surface and being of sufficient length to bridge the spaced rails and protrude therebeyond,
   each end portion of said top surface being planar to receive load supporting fittings thereon,
   the end portions of said bottom surface each having notches into which said spaced rails are received, said notches being of sufficient width to accommodate either widely spaced or narrowly spaced load supporting rails.

8. The device of claim 7 wherein said adapter is provided adjacent each notch with a lock bar which is adapted when in locked position to be received in one of the perforations spaced along a rail being engaged by said notch.

* * * * *